United States Patent [19]

Dain

[11] Patent Number: 4,987,518
[45] Date of Patent: Jan. 22, 1991

[54] METAL-CASED ELECTROLYTIC CAPACITOR

[75] Inventor: Lester C. Dain, West Jefferson, N.C.

[73] Assignee: Sprague Electric Company, North Adams, Mass.

[21] Appl. No.: 179,695

[22] Filed: Apr. 11, 1988

[51] Int. Cl.⁵ .......................................... H01G 1/02
[52] U.S. Cl. ................................................ 361/517
[58] Field of Search .............. 361/433, 306, 433 W, 361/517, 521

[56] References Cited

U.S. PATENT DOCUMENTS

| | | | |
|---|---|---|---|
| 2,033,309 | 3/1936 | Siegmund | 361/433 W |
| 2,144,959 | 1/1939 | Blackburn | 361/433 T |
| 2,274,327 | 2/1942 | Georgiev et al. | 361/521 |
| 2,962,638 | 11/1960 | Nieders | 361/433 |
| 3,010,056 | 11/1961 | Kurland et al. | 361/330 X R |
| 3,182,238 | 5/1965 | Toder et al. | 361/433 W XR |
| 3,509,427 | 4/1970 | Ruscetta | 361/433 |
| 4,164,006 | 8/1979 | Kolkowski | 361/433 |
| 4,298,906 | 11/1981 | Elias | 361/433 |
| 4,352,147 | 9/1982 | Elias et al. | 361/433 |
| 4,698,725 | 10/1987 | MacDougall et al. | 361/433 X R |

FOREIGN PATENT DOCUMENTS

| | | | |
|---|---|---|---|
| 904083 | 2/1954 | Fed. Rep. of Germany | 361/433 |
| 1012539 | 4/1952 | France | 361/433 |

Primary Examiner—Donald A. Griffin

[57] ABSTRACT

A wound electrolytic capacitance section is housing within a metal can having a plurality of circumferential indentations or ribs. The uppermost rib provides a seat for the capacitor cover. The lowermost rib determines the depth to which the section extends into the can and provides bottom support for the section. At least one intermediate rib provides lateral support for the section and prevents its lateral movement.

5 Claims, 1 Drawing Sheet

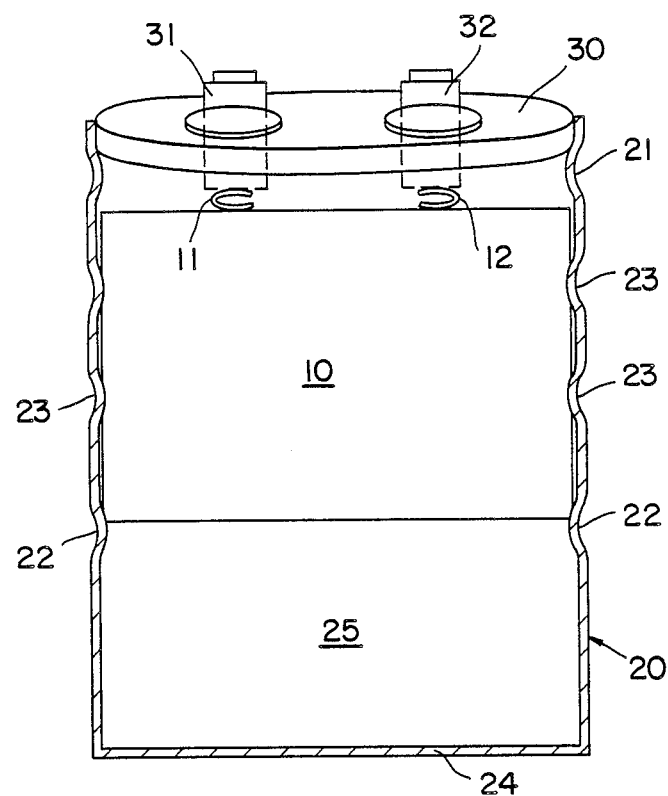

METAL-CASED ELECTROLYTIC CAPACITOR

BACKGROUND OF THE INVENTION

This invention relates to a metal-cased electrolytic capacitor, and more particularly to such a capacitor in which the capacitance section does not fill the metal case.

Improvements in the manufacture and processing of electrode foils for use in electrolytic capacitors have resulted in foils that offer higher capacitance, which has led directly to a reduction in the size of capacitance sections that are required for a given capacitance rating. This development, in turn, has led to smaller finished capacitors being offered to the market.

However, some end-equipment manufacturers require specific physical sizes for capacitors so that they will not need to redesign their electronic products and/or retool their wiring board insertion equipment in order to use smaller capacitors. On the other hand, inasmuch as capacitance sections account for 70 to 80% of total capacitor cost, capacitor manufacturers do not wish to make sections for a given capacitance rating which are larger than they need to be.

It is known in the prior art to roll a series of capacitance sections to the same diameter (same length of foil) but different widths (height of section) in order to provide a series of different capacitances in a given diameter can. Such is taught by Kolkowski in U.S. Pat. No. 4,164,006 issued Aug. 7, 1979. However, in the correlated capacitors of Kolkowski, the capacitance section extends to and is supported by the bottom of a can of proper height.

It is also known in the prior art to roll a capacitance section to a given diameter on different arbor sizes providing a hole extending longitudinally through the capacitor section. It is also known to indent can housings so as to provide lateral support for capacitance sections. Both concepts are taught by Elias and Granger in U.S. Pat. No. 4,352,147 issued Sept. 28, 1982. Again, the capacitor section of Elias et al extends to the bottom of the metal can housing and is supported thereby.

SUMMARY OF THE INVENTION

An object of this invention is to provide a capacitor in which a capacitance section is housed securely within a metal can which is larger than the section requires.

Another object of this invention is to provide such a capacitor without general need for support pieces, spacers, or fillers which add to the cost of the capacitor.

Another object of the invention is to accomplish the above advantages while using existing capacitor manufacturing techniques and tools.

This invention solves the foregoing dilemma between the objectives of the capacitor producers and their customers by permitting the use of a smaller capacitance section in a can which is longer than the section.

In accordance with this invention a convolutely-wound capacitance section is mounted in a metal can which is provided with a plurality of circumferential indentations or ribs. The uppermost rib provides a seat for a cover which carries capacitor terminals extending therethrough. The lowermost rib determines the depth to which the capacitance section extends into the can and provides support for the bottom of the section. One or more intermediate ribs provide lateral support for the section and prevent its lateral movement in the can. The space that remains between the bottom of the section and the bottom of the can forms an air-gap.

In the present invention, a capacitance section is convolutely-wound to a given diameter and placed in a housing which is significantly taller than the height of the section. The housing has a plurality of circumferential indentations or ribs, the lowermost of which is spaced from the bottom of the housing and determines the depth to which the section extends into the housing. The lowermost rib also serves as the support for the bottom of the section around its circumference. The space between the bottom of the section and the bottom of the housing is filled with air.

The uppermost indentation or rib provides a seat for a cover for the capacitor assembly. Intermediate intentation(s) or rib(s) provide lateral support for the section and prevent its lateral movement.

BRIEF DESCRIPTION OF THE DRAWING

The sole FIGURE is a partial cutaway drawing of the capacitor of the present invention in which a capacitance section is located within a housing which is taller than the section.

DESCRIPTION OF THE PREFERRED EMBODIMENT

Capacitance section 10 is rolled to a given diameter by selecting a given length of spacer material which is convolutely wound with conventional electrode foils. The diameter is such as to provide a customary prior-art fit of substantially filling a metal can 20 which serves as a housing for section 10. The height of section 10 is varied according to the desired capacitance by employing foils and spacers of selected widths. Section 10 is provided with conventional electrode tabs 11 and 12, one connected to an anode foil of the section and one to a cathode foil.

Metal can 20 is provided with at least three indentations 21, 22, and 23. Indentation or rib 21 provides a seat for cover assembly 30. Indentation or rib 22 is spaced from rib 21 by approximately the height of section 10 and determines the depth to which section 10 extends into can 20. Rib 22 also provides bottom support for section 10 and is spaced from the bottom of can 20. One or more indentations or ribs 23 provide lateral support for and prevent lateral movement of section 10.

Space 25 between bottom 24 of can 20 and the bottom of section 10 is filled with air and provides an air-gap. This air-gap may provide some support for section 10, particularly during capacitor operation when the air expands because of internal heating. Rib 22 and the tightness of present winding practices obviate the need in most capacitor usages for extra support pieces or anchors in the bottom of can 20 to support section 10 vertically.

In those capacitors which are subject to extreme vibrational environments, additional support has been found advantageous to ensure against telescoping of the capacitance section. A perforated disc atop rib 22 provides suitable support for section 10, as could any conventional spider or the like which bridges between the bottom of case 20 and section 10.

The capacitor assembly is completed by attaching electrode tabs 11 and 12 in a known manner to the bottoms of terminals 31 and 32, respectively, which are located in cover assembly 30. Cover assembly is seated against rib 21, and the capacitor is sealed by customary prior art means.

I claim:

1. In a metal-cased electrolytic capacitor, means permitting the utilization of a conventional metal capacitor can of a given length so as to house a capacitance section of a newer and shorter length than said can, said means including a convolutely-wound capacitance section having high capacitance anode foil and cathode foil wound with interleaved spacer material to the same diameter as said can, said section being shorter than said can and being located within said can having a bottom as a housing, said can having at least three circumferential indentations, one of said indentations being uppermost and providing a seat for a cover for final sealing of said capacitor, another of said indentations being lowermost and spaced from said bottom of said can and providing support beneath an end of said section around its circumference thereby limiting said section to extend into aid can only to a fixed predetermined depth, and at least one other of said indentations between said uppermost indentation and said lowermost indentation providing lateral support for and preventing lateral movement of said section.

2. A capacitor according to claim 1 wherein space between said lowermost indentation and the bottom of said can is occupied by air providing an air-gap in the lowermost portion of said can.

3. A capacitor according to claim 1 wherein said lowermost indentation provides total bottom support for said section.

4. A capacitor according to claim 1 wherein said section contains given lengths of foil and spacer material so as to provide a given predetermined diameter winding so as to substantially fit the diameter of said metal can.

5. A capacitor according to claim 1 wherein said section has an electrode tab connected to said anode foil and an electrode tab connected to said cathode, foil, each said tab being connected to a respective terminal means located in said cover.

* * * * *